US012386139B2

(12) United States Patent
Wu et al.

(10) Patent No.: US 12,386,139 B2
(45) Date of Patent: Aug. 12, 2025

(54) LENS MODULE AND FASTENING ASSEMBLY

(71) Applicant: Coretronic Corporation, Hsin-Chu (TW)

(72) Inventors: Chia-Cheng Wu, Hsin-Chu (TW); Yen-Ming Tseng, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 860 days.

(21) Appl. No.: 17/573,649

(22) Filed: Jan. 12, 2022

(65) Prior Publication Data
US 2022/0236511 A1 Jul. 28, 2022

(30) Foreign Application Priority Data
Jan. 22, 2021 (CN) .......................... 202120189921.2

(51) Int. Cl.
G02B 7/02 (2021.01)
(52) U.S. Cl.
CPC ............. G02B 7/022 (2013.01); G02B 7/026 (2013.01)
(58) Field of Classification Search
CPC ......... G02B 7/022; G02B 7/026; G02B 7/023
See application file for complete search history.

(56) References Cited

U.S. PATENT DOCUMENTS

| 10,466,575 B1* | 11/2019 | Chen ................... G02B 27/0955 |
| 2002/0067552 A1* | 6/2002 | Tanabe .................... G02B 27/62 |
| | | 359/701 |
| 2008/0198340 A1* | 8/2008 | Tsai ....................... H04N 9/317 |
| | | 353/100 |
| 2016/0160529 A1* | 6/2016 | Carnevali ............... F16B 39/12 |
| | | 70/344 |

FOREIGN PATENT DOCUMENTS

| CN | 208123222 | | 11/2018 |
| CN | 208123222 U | * | 11/2018 |
| TW | I323325 | | 4/2010 |
| TW | 201613512 | | 4/2016 |
| TW | 201734532 | | 10/2017 |
| TW | M587718 | | 12/2019 |

* cited by examiner

*Primary Examiner* — Wyatt A Stoffa
*Assistant Examiner* — Ray Alexander Dean
(74) *Attorney, Agent, or Firm* — JCIPRNET

(57) ABSTRACT

A lens module and a fastening assembly are provided. The lens module includes a carrier, a lens having at least one fastening part, at least one fastening assembly including first and second fastening members, and at least one elastic member disposed between the carrier and the fastening part to push the fastening part toward the second fastening member. The first fastening member has a first external thread and a second external thread. The first external thread has a different thread pitch from the second external thread. The second fastening member has a first internal thread. The first fastening member penetrates the fastening part and is fastened to the carrier by the first external thread. The first and second fastening members are mutually fastened by the second external thread and the first internal thread, so that the fastening part is limited between the second fastening member and the carrier.

20 Claims, 12 Drawing Sheets

LENS MODULE AND FASTENING ASSEMBLY

CROSS-REFERENCE TO RELATED APPLICATION

This application claims the priority benefit of China application serial no. 202120189921.2, filed on Jan. 22, 2021. The entirety of the above-mentioned patent application is hereby incorporated by reference herein and made a part of this specification.

BACKGROUND

Technical Field

The disclosure relates to a fastening assembly, in particular, to a fastening assembly for a lens and a lens module with the fastening assembly.

Description of Related Art

With the development of technology, lens modules have been widely used in daily life. In general, an image is generated by a digital micromirror device (DMD) in a digital light processing (DLP) projector. According to the known optical design tolerance requirement, the flatness tolerance between the lens and the DMD should be less than 0.03 mm. For the machining tolerance of the components to meet the production requirement for the above precision, the machining cost of the components increases and the yield of the processed components becomes too low. Therefore, the current solution is to add a flatness tolerance compensation gasket or a boresight adjustment structure to the lens of the projector, so as to achieve the requirements for image balance optimization and clear projection images. However, the disadvantage of the former is that the flatness compensation gasket cannot be adjusted in real time during image projection. The disadvantage of the latter is that there is no tangential fillet (radian) between the adjustment screw of the boresight adjustment structure and the lens connection contact surface, so the degree of freedom of run-out adjustment is low after adjustment or fastening, which causes the lens housing structure to generate a micro-deformation force when being pulled and pressed. In addition, in the known method, the lens should be connected to an accessory plate, and then be fastened to other bearing seat components. As a result, when the assembled product falls or vibrates, the accumulated weight of the components causes a gradual decrease in the fastening force of the boresight screw due to the gravitational acceleration, thereby increasing the risk of loosening. Other accessory assemblies may increase the error of the cumulative tolerance in assembly. In addition, the known boresight structure has various complex components, a large device space requirement, and a need of different operation directions (fastening adjustment directions), which are disadvantageous for automatic assembly and automatic adjustment.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

The disclosure provides a lens module having a fastening assembly that allows a lens to have a better degree of freedom of run-out adjustment.

The disclosure provides a fastening assembly that allows a lens to have a better degree of freedom of run-out adjustment.

Other objectives and advantages of the disclosure may be further understood from the technical features disclosed herein.

An embodiment of the disclosure provides a lens module including a carrier, a lens, at least one fastening assembly, and at least one elastic member. The lens has at least one fastening part. The fastening assembly includes a first fastening member and a second fastening member. The first fastening member has a first external thread and a second external thread, and a thread pitch of the first external thread is different from a thread pitch of the second external thread. The second fastening member has a first internal thread. The first fastening member is configured to penetrate the fastening part and be fastened to the carrier by the first external thread. The first fastening member and the second fastening member are configured to be mutually fastened by the second external thread and the first internal thread, so that the fastening part is limited between the second fastening member and the carrier. The elastic member is disposed between the carrier and the fastening part, and is configured to push the fastening part toward the second fastening member.

An embodiment of the disclosure provides a fastening assembly including a first fastening member and a second fastening member. The first fastening member has a first external thread and a second external thread, and a thread pitch of the first external thread is different from a thread pitch of the second external thread. The second fastening member has a first internal thread. The first fastening member and the second fastening member are configured to be mutually fastened by the second external thread and the first internal thread.

Based on the above, the embodiments of the disclosure have at least one of the following advantages or effects. With the thread pitch of the first external thread of the first fastening member of the fastening assembly being different from the thread pitch of the second external thread, the first fastening member, the second fastening member, or both may generate different displacement strokes with respect to the carrier in the process of rotating and screwing, and may have various combinations for micro-adjusting a distance between the lens and the carrier.

Other objectives, features and advantages of the disclosure will be further understood from the further technological features disclosed by the embodiments of the disclosure wherein there are shown and described preferred embodiments of the disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

In the following detailed description of the preferred embodiments, reference is made to the accompanying drawings which form a part hereof, and in which are shown by way of illustration specific embodiments in which the disclosure may be practiced. In this regard, directional terminology, such as "top," "bottom," "front," "back," etc., is used with reference to the orientation of the Figure(s) being described. The components of the disclosure can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

The above and other technical contents, features and effects of the disclosure will be apparent from the following detailed description of a preferred embodiment with reference to the accompanying drawings. Directional terms mentioned in the text, such as "upper," "lower," "front," "back," "left," "right," etc., merely refer to directions with reference to the accompanying drawings. Therefore, the directional terms used are used to illustrate, but not to limit the disclosure.

Figure 1A:
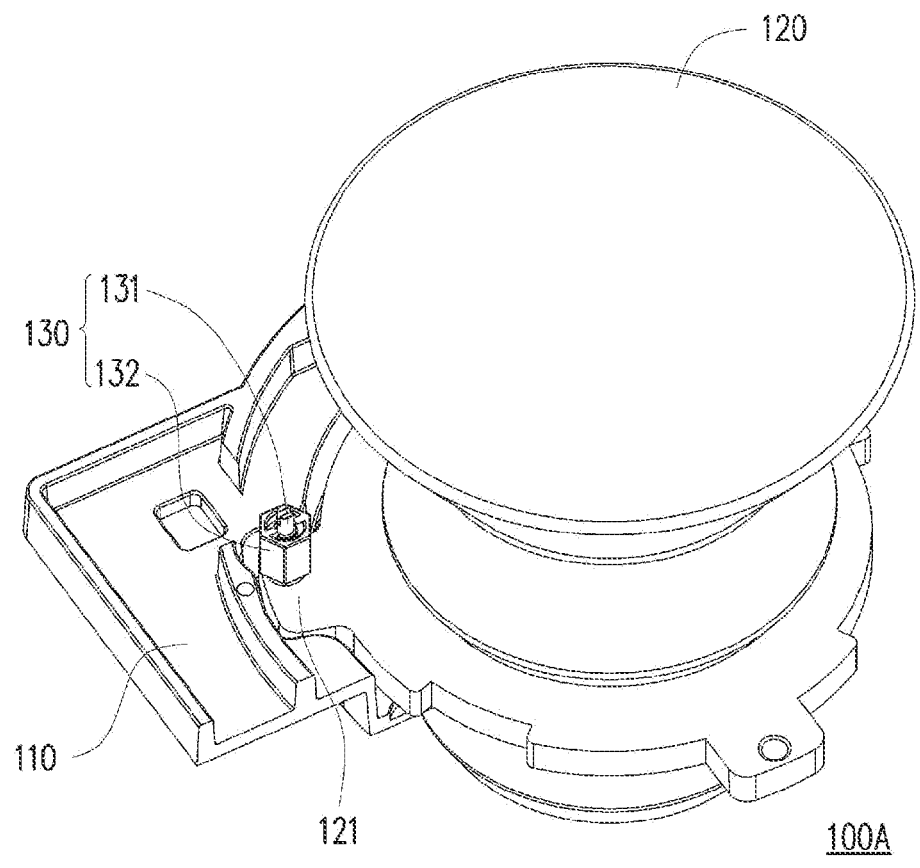
FIG. 1A is a schematic view of a lens module according to an embodiment of the disclosure.
Figure 1B:
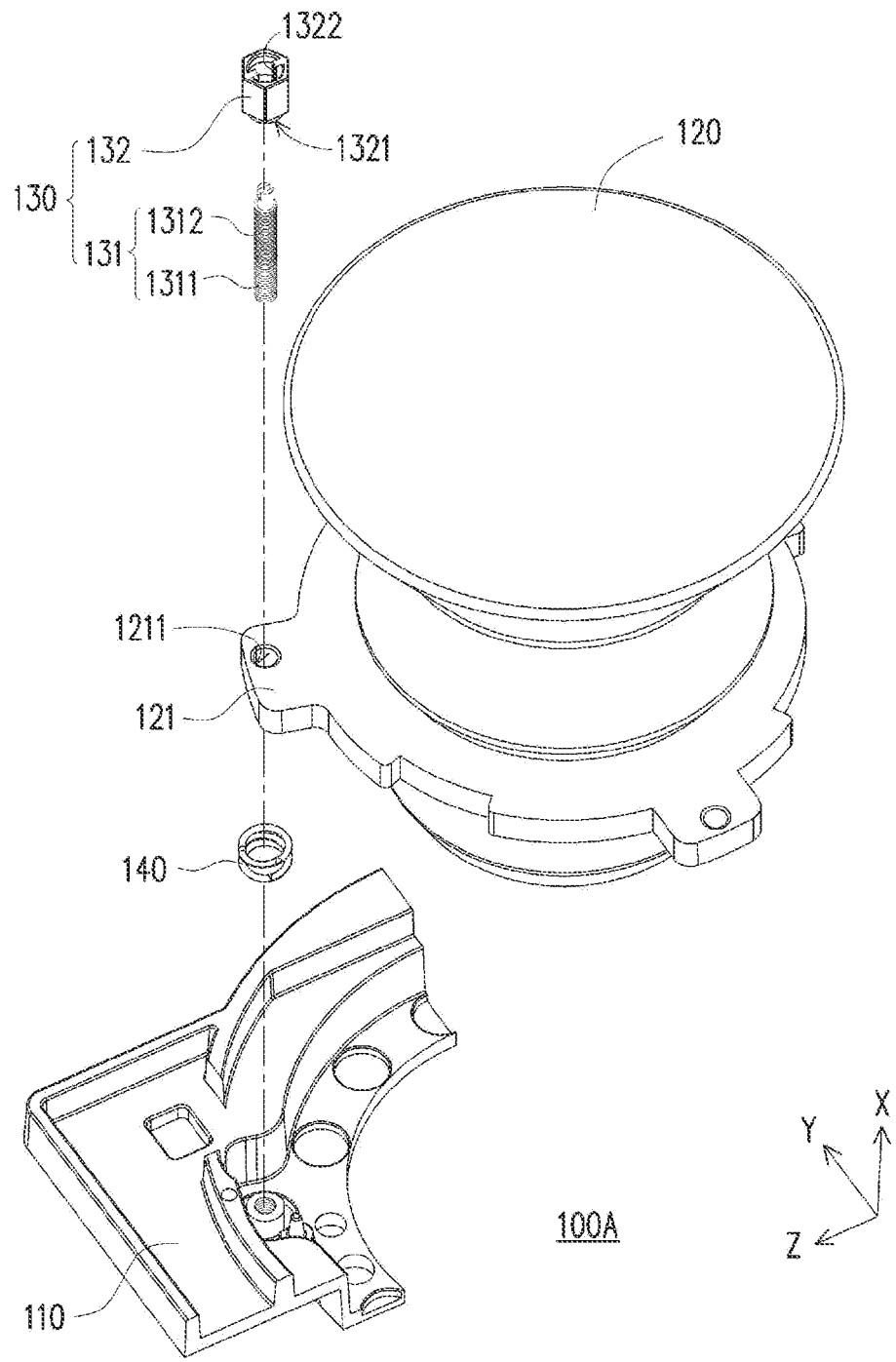
FIG. 1B is an exploded view of the lens module of FIG. 1A.

FIG. 1A is a schematic view of a lens module according to an embodiment of the disclosure FIG. 1B is an exploded view of the lens module of FIG. 1A. In order to make the drawings more comprehensible, FIG. 1A and FIG. 1B only show a part of a carrier 110. Referring to FIG. 1A and FIG. 1B, a lens module 100A of the embodiment includes a carrier 110, a lens 120, at least one fastening assembly 130, and at least one elastic member 140. The lens 120 has at least one fastening part 121, and the fastening part 121 has a through-hole 1211. The fastening assembly 130 includes a first fastening member 131 and a second fastening member 132. Here, the elastic member 140, for example, is a spring. The first fastening member 131, for example, is a bolt. The second fastening member 132, for example, is a nut.

In the embodiment, the first fastening member 131 has a first external thread 1311 and a second external thread 1312, and a thread pitch of the first external thread 1311 is different from a thread pitch of the second external thread 1312. The second fastening member 132 has a first internal thread 1322. The first fastening member 131 is configured to penetrate the through-hole 1211 and be fastened to the carrier 110 by the first external thread 1311. The first fastening member 131 and the second fastening member 132 are configured to be mutually fastened by the second external thread 1312 and the first internal thread 1322, so that the fastening part 121 is limited between the second fastening member 132 and the carrier 110 as shown in FIG. 1B.

Figure 1C:
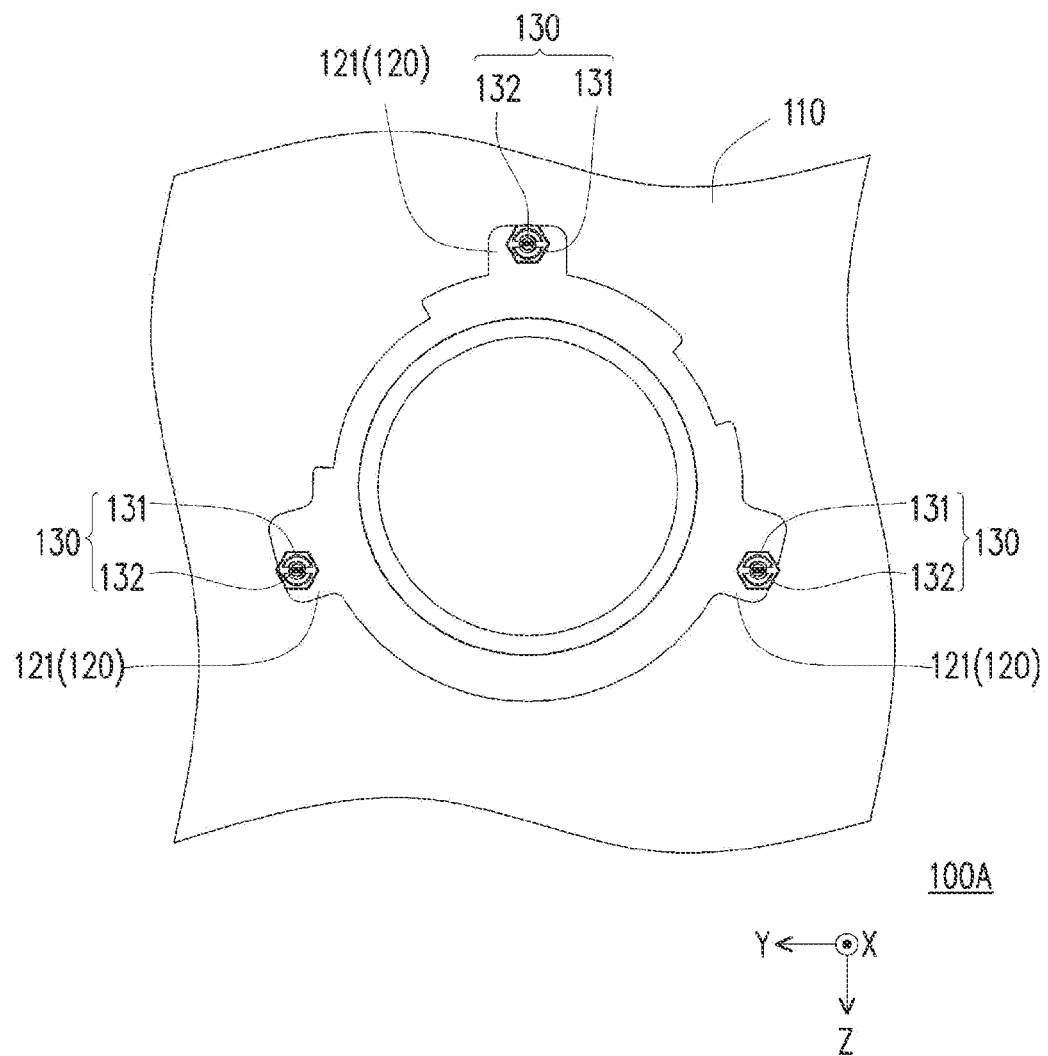
FIG. 1C is a schematic top view of the lens module of FIG. 1A.

FIG. 1C is a schematic top view of the lens module of FIG. 1A. In fact, the carrier 110 surrounds the periphery of the lens 120 as shown in FIG. 1C, forming a space for the lens 120 to be disposed. To make the drawing more comprehensible, the lens 120 of FIG. 1A is only partially shown in FIG. 1C. In the embodiment, the number of the fastening assemblies 130 is three, thereby forming a plane with three points, and in other embodiments, the number of fastening assemblies may be adjusted for the lens to be well fixed on the carrier, but the disclosure is not limited thereto.

Figure 1D:
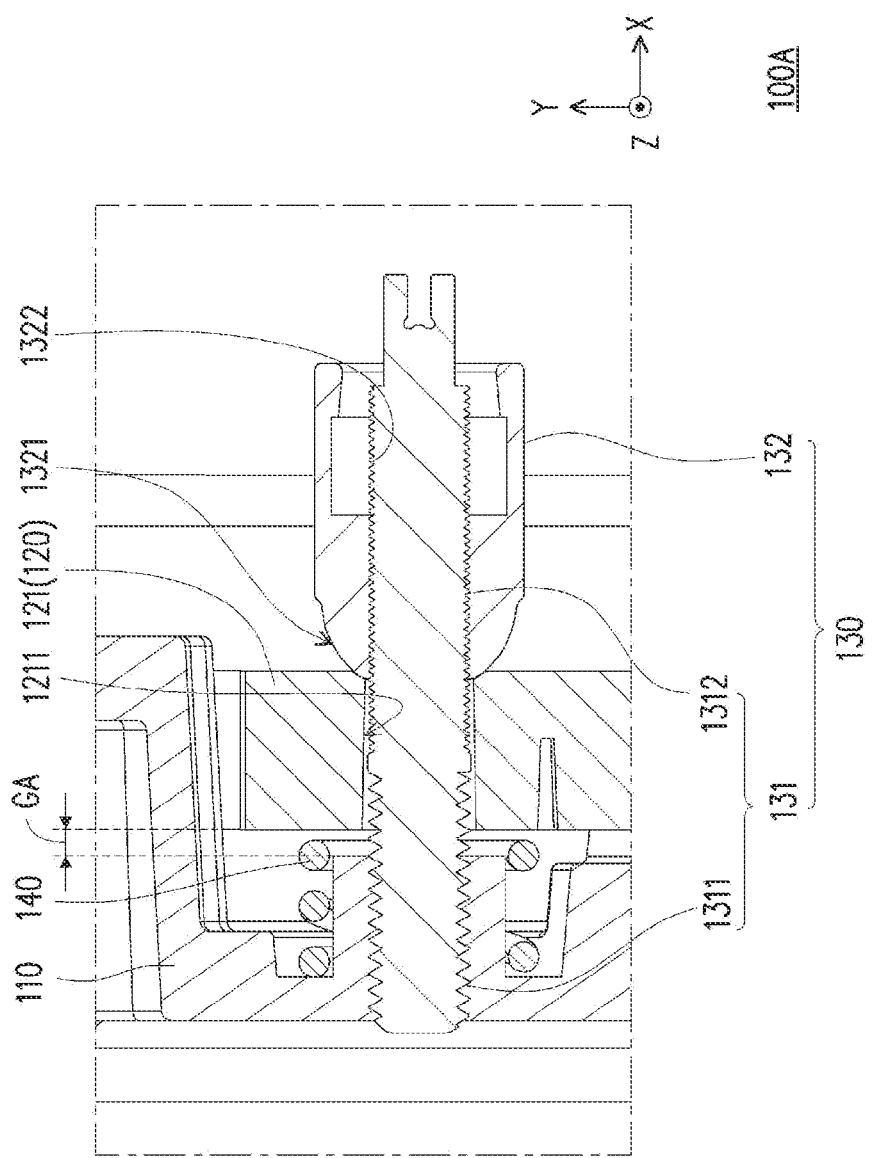
FIG. 1D is a schematic partial cross-sectional view of the lens module of FIG. 1A.

In the embodiment, the number of the elastic members 140 corresponds to the number of the fastening assemblies 130. FIG. 1D is a schematic partial cross-sectional view of the lens module of FIG. 1A. In the embodiment, the elastic member 140 is disposed between the carrier 110 and the fastening part 121, and is compressed to be configured to push the fastening part 121 toward the second fastening member 132. Here, the elastic member 140, for example, is sleeved on the carrier 110, but is not limited thereto.

Based on the above configuration, the first fastening member 131 is fastened to the carrier 110, and the fastening torque of the first fastening member 131 is greater than the fastening torque of the second fastening member 132. After the through-hole 1211 and the elastic member 140 are penetrated by the first fastening member 131, the second fastening member 132 pre-fastens the lens 120 to a pre-fastening position. Therefore, a gap GA may be adjusted by an appropriate tool. An adjustment method, for example, is as follows. a. The second fastening member 132 is fastened in a negative X direction. b. A bearing surface of the carrier 110 is set as an adjustment original point after coming into contact with a reference surface of the fastening part 121 of the lens 120. c. The center of the second fastening member 132 is close to or coincides with the center of the through-hole 1211. d. An action force of the elastic member 140 is applied in a positive X direction, pressing the lens 120 tightly on an abutting surface of the second fastening member 132. Here, the action force of the elastic member 140 only needs to bear a reaction force generated by the weight of the lens 120. e. The lens module 100A includes three fastening assemblies 130, that is, the lens 120 has three adjustment points. Under the two forces in the negative X direction and the positive X direction, each adjustment point is unlikely to shift in X, Y, and Z directions to cause a focus displacement.

Figure 1E:
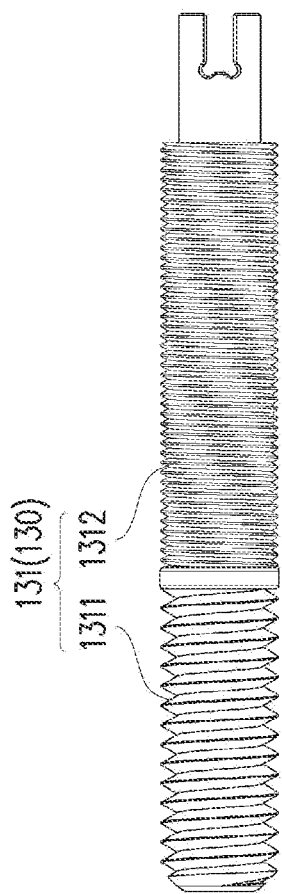
FIG. 1E is a schematic view of a first fastening member of FIG. 1B.

FIG. 1E is a schematic view of a first fastening member of FIG. 1B. In the embodiment, the thread pitch of the first external thread 1311 is greater than the thread pitch of the second external thread 1312. The specification of the first external thread 1311, for example, is M3, and the thread pitch is 0.5 mm. The first external thread 1311 is defined as a coarse thread area, and is a right-hand thread. The specification of the second external thread 1312, for example, is M2.6, and the thread pitch is 0.45 mm. The second external thread 1312 is defined as a fine thread area, and is a left-hand thread. The first internal thread 1322 of the second fastening member 132, for example, is a left-hand thread. In general, the operation of the right-hand thread is that the thread advances when rotating right and returns when rotating left, whereas the left-hand thread is opposite thereto.

In other words, the first external thread 1311 (the coarse thread area) and the second external thread 1312 (the fine thread area) of the first fastening member 131 of the embodiment have opposite rotation threads, and the first internal thread 1322 of the second fastening member 132 has the same rotation thread as the second external thread 1312 (the fine thread area), but the disclosure is not limited thereto.

Based on the above configuration, a micro-adjustment method may include three stages. The first stage, for example, is that the first fastening member 131 and the second fastening member 132 synchronously rotate a circle in a first rotation direction (e.g., clockwise or right-handed). The lens 120 moves about 0.5 mm in the negative X direction in the first stage. The second stage, for example, is that the second fastening member 132 independently rotates a circle in a second rotation direction (e.g., counterclockwise or left-handed) opposite to the first rotation direction, and moves toward the carrier 110 along the first fastening member 131, whereas the first fastening member 131 does not rotate. The lens 120 moves about 0.45 mm in the negative X direction in the second stage. The third stage, for example, is that the first fastening member 131 independently rotates a circle in the first rotation direction (e.g., clockwise or right-handed), whereas the second fastening member 132 does not rotate. That is, the first fastening member 131 rotates with respect to the second fastening member 132 and the through-hole 1211. The first fastening member 131 advances a circle and the second fastening member 132 advances a circle. The lens 120 incrementally moves about 0.95 mm (0.5 mm plus 0.45 mm) in the negative X direction in the third stage. If the adjustment stroke of the lens 120 is relatively long, the lens 120 may be accelerated to arrive a predetermined adjustment position, and then detailed adjustment is performed by using the first stage or the second stage.

In this way, with the thread pitch of the first external thread 1311 of the first fastening member 131 of the fastening assembly 130 being different from the thread pitch of the second external thread 1312, the first fastening member 131, the second fastening member 132, or both may generate different displacement strokes with respect to the carrier 110 in the process of rotating and screwing, and consequently, may have various combinations for micro-adjusting a distance between the lens 120 and the carrier 110, and may adjust at multiple points at the same time without the threads rotating in opposite directions, and without causing mutual restraint or interference.

Furthermore, referring to FIG. 1D, an end of the second fastening member 132 has an arc-shaped surface 1321, and the arc-shaped surface 1321 is configured to be in contact with the fastening part 121. The first fastening member 131 is configured to penetrate the through-hole 1211, and the arc-shaped surface 1321 is configured to abut against an end of the through-hole 1211. Therefore, a contact surface between the second fastening member 132 and the fastening part 121 of the lens 120 has fillets, and the second fastening member 132 and the lens 120 are in linear contact. Compared with the existing design in which a fastening screw and a lens connection contact surface are in surface contact, the fastening assembly 130 of the embodiment may achieve a better degree of freedom of lens run-out adjustment, and a housing structure of the lens 120 is unlikely to generate micro-deformation force when being pulled or pressed.

Other embodiments are listed below for description. It should be noted that the following embodiments use the reference numbers and part of the contents of the aforementioned embodiments. The same reference numbers are used to represent the same or similar elements, and the description of the same technical content is omitted. The description of the omitted part may be referred to the aforementioned embodiments, and is not repeated in the following embodiments.

Figure 1F:
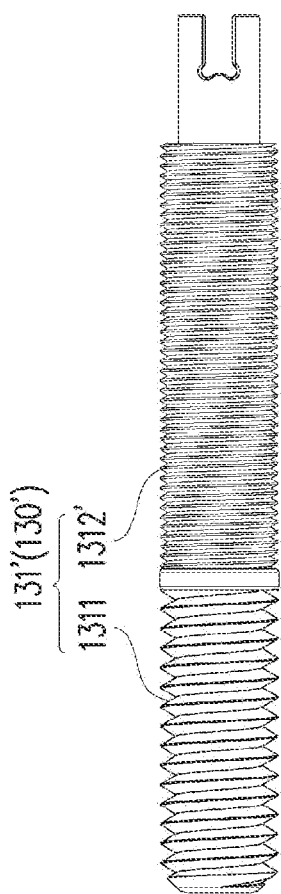
FIG. 1F is a schematic view of a first fastening member according to another embodiment of the disclosure.

FIG. 1F is a schematic view of a first fastening member according to another embodiment of the disclosure. Referring to FIG. 1F, in the embodiment, a first fastening member 131' is slightly different from the first fastening member 131 of FIG. 1E. The difference is that a second external thread 1312' of the first fastening member 131' of a fastening assembly 130' has a right-hand thread. In other words, the first external thread 1311 (the coarse thread area) and the second external thread 1312' (the fine thread area) have the same rotation threads, and the first internal thread 1322 of the second fastening member 132 as shown in FIG. 1B, for example, has the same rotation thread as the second external thread 1312' (the fine thread area).

Based on the above configuration, the micro adjustment method may include three stages. The first stage, for example, is that the first fastening member 131' and the second fastening member 132 as shown in FIG. 1B synchronously rotate a circle in the first rotation direction (e.g., clockwise or right-handed). The lens 120 moves about 0.5 mm in the negative X direction in the first stage. The second stage, for example, is that the second fastening member 132 independently rotates a circle in the first rotation direction (e.g., clockwise or right-handed) and moves toward the carrier 110 along the first fastening member 131', whereas the first fastening member 131' does not rotate. The lens 120 moves about 0.45 mm in the negative X direction in the second stage. The third stage, for example, is that the first fastening member 131' independently rotates a circle in the first rotation direction (e.g., clockwise or right-handed), whereas the second fastening member 132 does not rotate. That is, the first fastening member 131 rotates with respect to the second fastening member 132 and the through-hole 1211. The first fastening member 131 advances a circle and the second fastening member 132 returns a circle. The lens 120 incrementally moves about 0.05 mm (0.5 mm minus 0.45 mm) in the negative X direction in the third stage. The above adjustment method uses a full circle of rotation as an adjustment unit, and for example, the adjustment method may use a one-fifth circle of rotation as the adjustment unit. In this way, each adjustment unit may be as fine as 0.01 mm at a minimum.

The distance between the lens 120 and the carrier 110 may be micro-adjusted according to the above. Existing nominal specifications of right-hand screws having different thread pitches may be used to perform various combinations of micro-adjustment size requirements, and may adjust at multiple points at the same time without the threads rotating in opposite directions, and without causing mutual restraint or interference.

Figure 2:
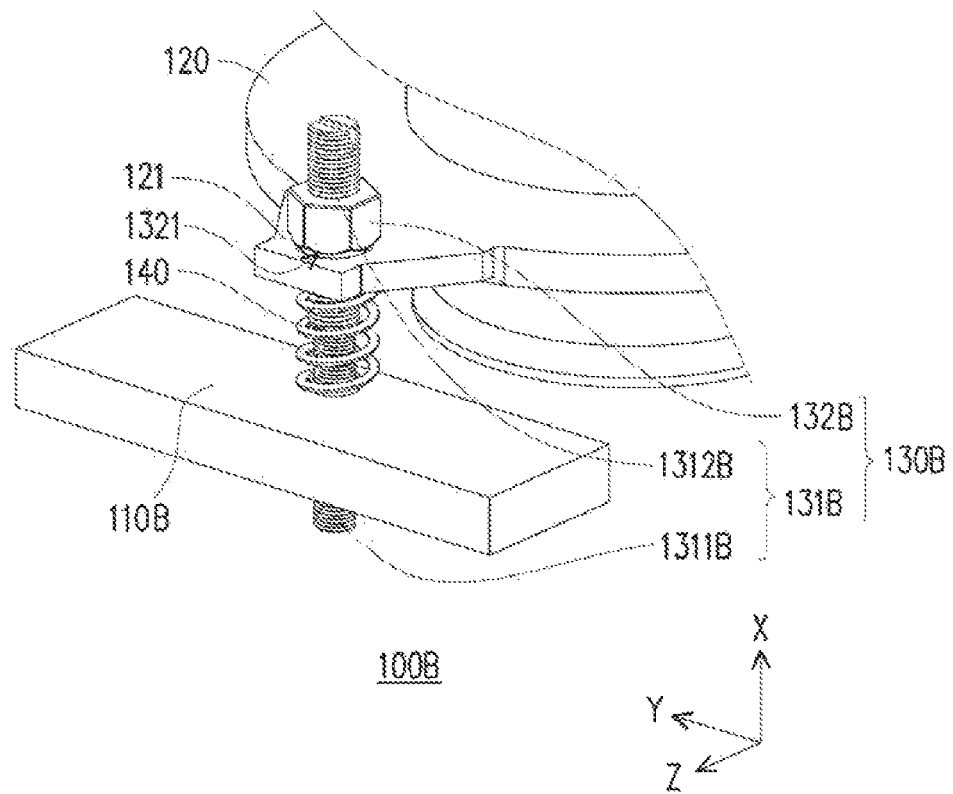
FIG. 2 is a schematic partial view of a lens module according to another embodiment of the disclosure.

FIG. 2 is a schematic partial view of a lens module according to another embodiment of the disclosure. Referring to FIG. 2, a thread pitch of a first external thread 1311B of a first fastening member 131B of a lens module 100B of the embodiment is less than a thread pitch of a second external thread 1312B. Specifically, the specification of the first external thread 1311B, for example, is M2.6, and the thread pitch is 0.45 mm. The first external thread 1311B is defined as the fine thread area. The specification of the second external thread 1312B, for example, is M3, and the thread pitch is 0.5 mm. The second external thread 1312B is defined as the coarse thread area. In an embodiment, the first external thread 1311B and the second external thread 1312B of the first fastening member 131B of the fastening assembly 130B have different rotation threads, and a first internal thread 1322B (not shown) of a second fastening member 132B, for example, has the same rotation thread as the second external thread 1312B.

Based on the above configuration, the micro-adjustment method may include three stages. The first stage, for example, is that the first fastening member 131B and the second fastening member 132B synchronously rotate a circle in the first rotation direction (e.g., clockwise or right-handed). The lens 120 moves about 0.45 mm in the negative X direction in the first stage. The second stage, for example, is that the second fastening member 132B independently rotates a circle in the first rotation direction (e.g., clockwise or right-handed) and moves toward the carrier 110B along the first fastening member 131B, whereas the first fastening member 131B does not rotate. The lens 120 moves about 0.5 mm in the negative X direction in the second stage. The third stage, for example, is that the first fastening member 131B independently rotates a circle in the first rotation direction (e.g., clockwise or right-handed), whereas the second fastening member 132B does not rotate. The lens 120 incrementally moves about 0.05 mm (0.45 mm minus 0.5 mm) in the X direction.

In another embodiment, the first external thread 1311B and the second external thread 1312B of the first fastening member 131B of the fastening assembly 130B have the same rotation threads. Accordingly, the first stage, for example, is that the first fastening member 131B and the second fastening member 132B synchronously rotate a circle in the first rotation direction (e.g., clockwise or right-handed), and the lens 120 moves about 0.45 mm in the negative X direction. The second stage, for example, is that the second fastening member 132B independently rotates a circle in the first rotation direction (e.g., clockwise or right-handed) and moves toward the carrier 110B along the first fastening member 131B, whereas the first fastening member 131B does not rotate, and the lens 120 moves about 0.5 mm in the negative X direction. The third stage, for example, is that the first fastening member 131B independently rotates a circle in the first rotation direction (e.g., clockwise or right-handed), whereas the second fastening member 132B does not rotate, and the lens 120 incrementally moves about 0.95 mm (0.45 mm plus 0.5 mm) in the negative X direction.

Figure 3:
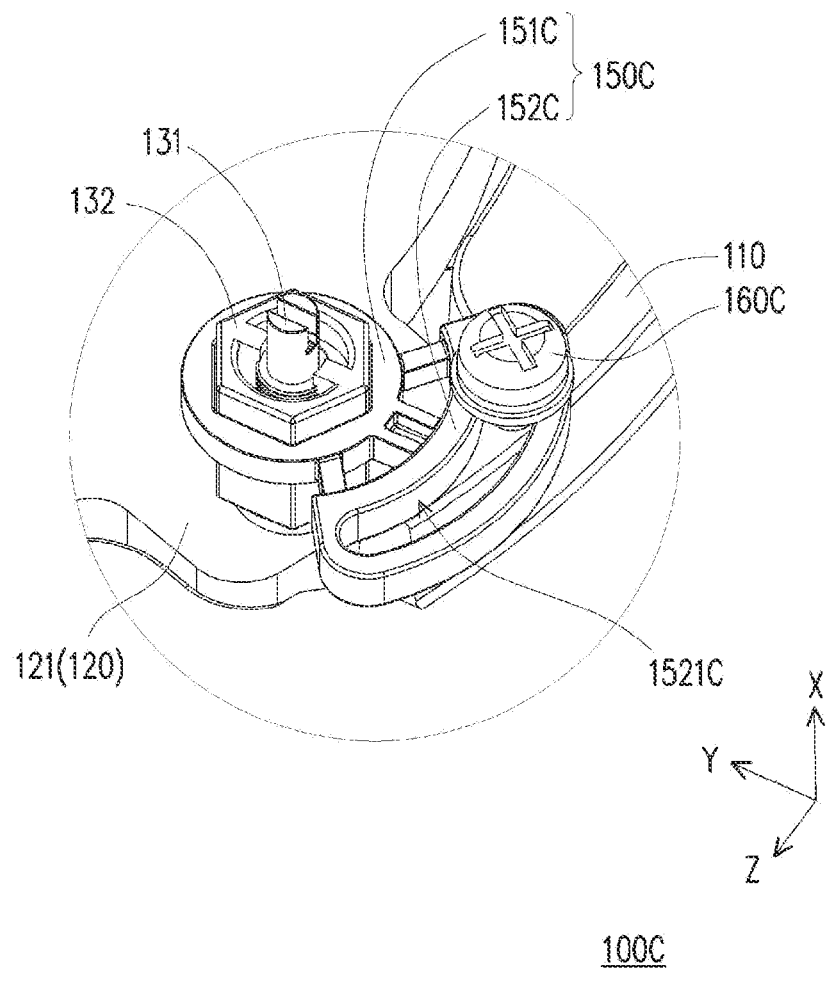
FIG. 3 is a schematic partial view of a lens module according to another embodiment of the disclosure.

FIG. 3 is a schematic partial view of a lens module according to another embodiment of the disclosure. Referring to FIG. 3, a lens module 100C of the embodiment is slightly different from the lens module 100A of FIG. 1A. The difference is that the lens module 100C includes at least one fixing member 150C and at least one third fastening member 160C. Here, the fixing member 150C, for example, is an anti-rotation linear displacement ensuring sheet, and the third fastening member 160C, for example, is a screw, but the disclosure is not limited thereto.

Specifically, the fixing member 150C has a clamping end 151C and a fastening end 152C. The clamping end 151C is a linear displacement end, and the clamping end 151C is configured to be clamped on the second fastening member 132. The fastening end 152C is an anti-rotation end, and the third fastening member 160C is configured to fasten the fastening end 152C to the carrier 110. The second fastening member 132 has a non-circular outer edge, such as a hexagon, and the clamping end 151C has a non-circular hole, such as a hexagon, and the non-circular outer edge is configured to be fitted on the non-circular hole. The fastening end 152C of the embodiment has an arc-shaped slot 1521C, and may be correspondingly fastened to the position of the carrier 110 by matching with the third fastening member 160C. The third fastening member 160C is configured to penetrate the arc-shaped slot 1521C and be fastened to the carrier 110. A curvature center of the arc-shaped slot 1521C of the embodiment is located on a rotation axis of the second fastening member 132, but the disclosure is not limited thereto. Therefore, after the lens 120 is adjusted and positioned, the second fastening member 132 may be firmly fixed to the clamping end 151C by the fixing member 150C, thereby ensuring a fastening force of the second fastening member 132.

Figure 4:
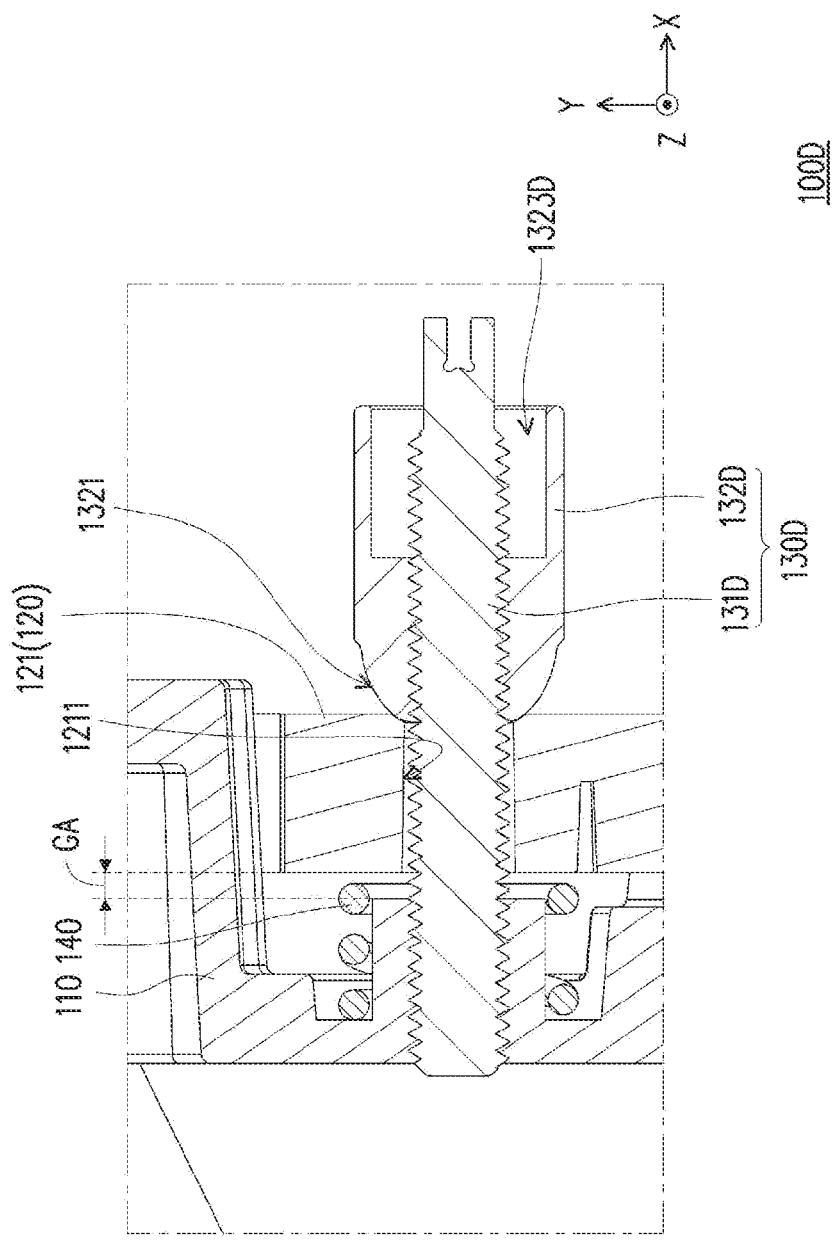
FIG. 4 is a schematic partial cross-sectional view of a lens module according to another embodiment of the disclosure.

FIG. 4 is a schematic partial cross-sectional view of a lens module according to another embodiment of the disclosure. Referring to FIG. 4, a second fastening member 132D of a fastening assembly 130D of a lens module 100D of the embodiment, for example, is a dispensing cup adjustment nut. Specifically, the second fastening member 132D has a dispensing groove 1323D, and the diameter of the dispensing groove 1323D is larger than the diameter of the internal thread of the second fastening member 132D. When a first fastening member 131D and the second fastening member 132D are mutually fastened, a part of the first fastening member 131D is located in the dispensing groove 1323D, thereby ensuring the fastening force of the second fastening member 132D. The dispensing groove 1323D may accommodate a large amount of adhesive, and may better control the amount of the adhesive, so that the adhesive is not scattered. Here, the thread pitches on the first fastening member 131D are the same, but the disclosure is not limited thereto.

Figure 5A:
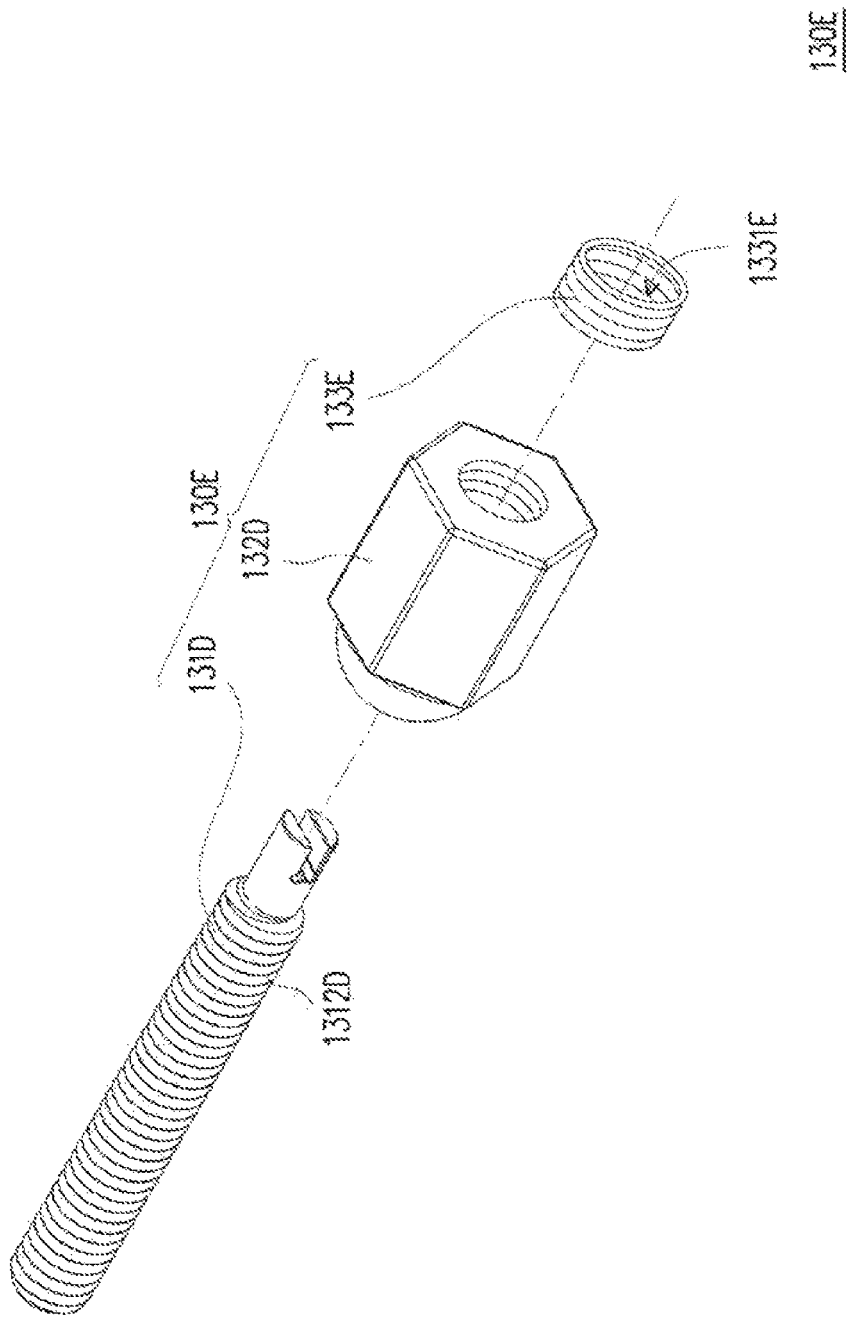
FIG. 5A is a schematic exploded view of a fastening assembly according to another embodiment of the disclosure.
Figure 5B:
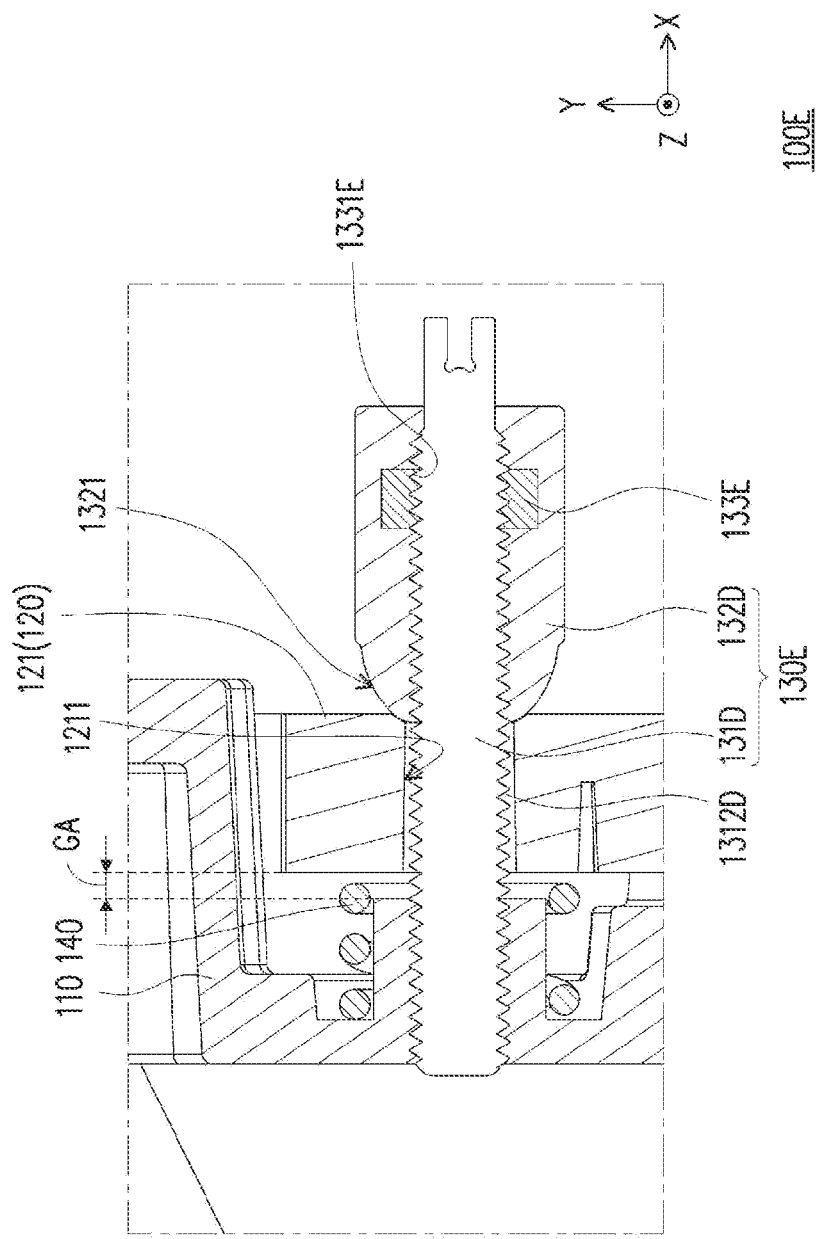
FIG. 5B is a schematic partial cross-sectional view of the fastening assembly of FIG. 5A being applied to a lens module.

FIG. 5A is a schematic exploded view of a fastening assembly according to another embodiment of the disclosure. FIG. 5B is a schematic partial cross-sectional view of the fastening assembly of FIG. 5A being applied to a lens module. Referring to FIG. 5A and FIG. 5B, a fastening assembly 130E of a lens module 100E of the embodiment includes an elastic body 133E, and the elastic body 133E is disposed in the second fastening member 132D. Here, the elastic body 133E, for example, is a lock washer. When the first fastening member 131D and the second fastening member 132D are mutually fastened, the elastic body 133E is compressed between the first fastening member 131D and the second fastening member 132D. In addition, the elastic body 133E has a second internal thread 1331E. The first fastening member 131D and the elastic body 133E are configured to be mutually fastened by the second external thread 1312D and the second internal thread 1331E. A friction between the first fastening member 131D and the second fastening member 132D may be adjusted through the size, material (soft or hard), and thread stroke of the elastic body 133E.

Figure 6A:
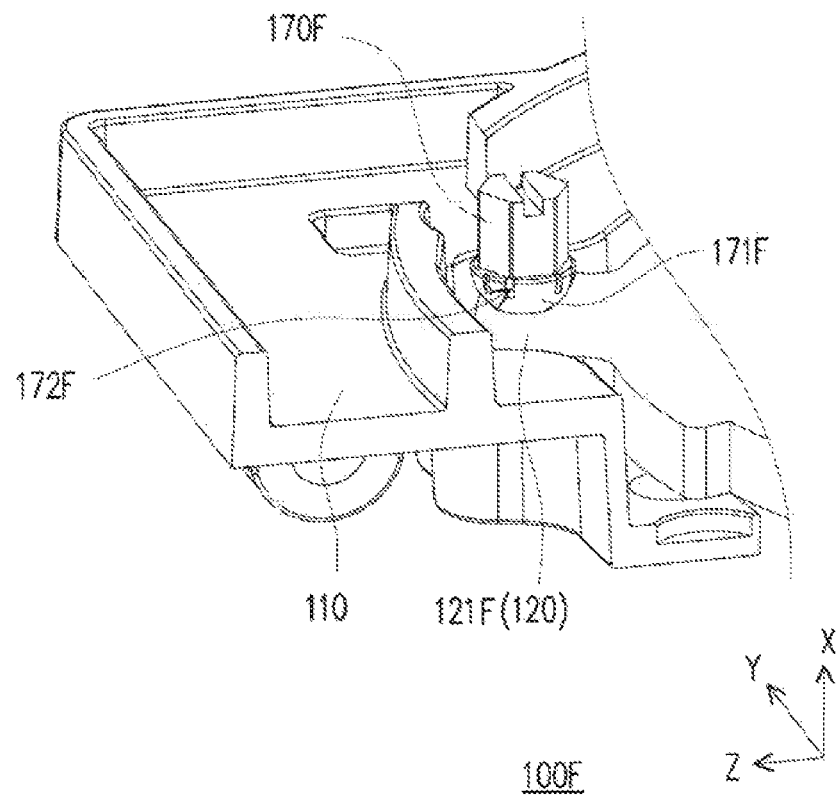
FIG. 6A is a schematic partial perspective cross-sectional view of a lens module according to another embodiment of the disclosure.
Figure 6B:
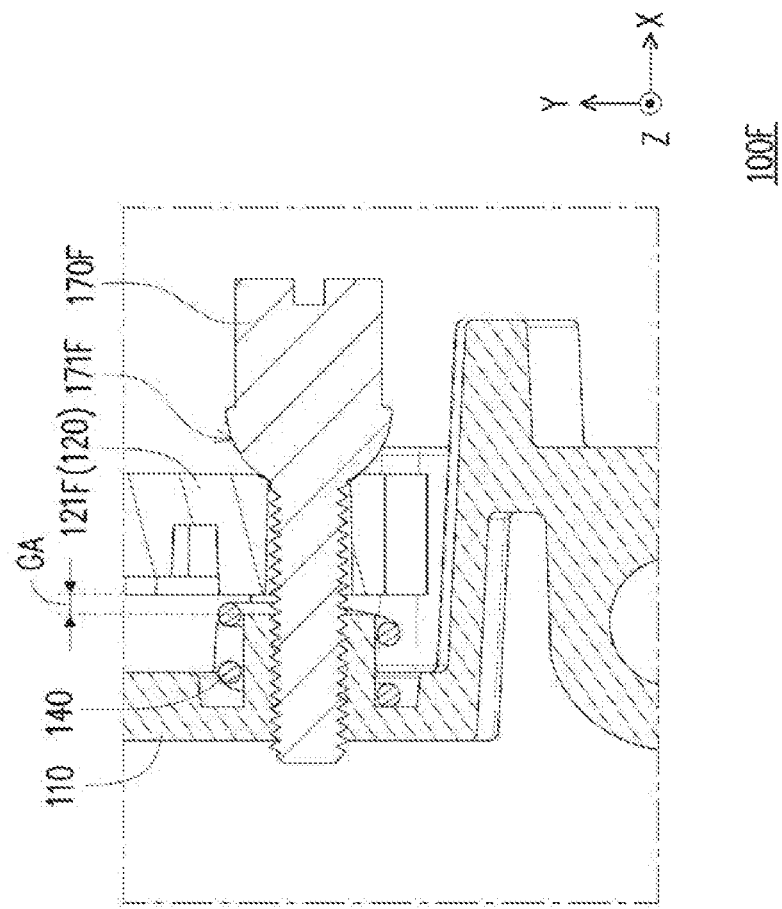
FIG. 6B is a schematic partial cross-sectional view of the lens module of FIG. 6A.

FIG. 6A is a schematic partial perspective cross-sectional view of a lens module according to another embodiment of the disclosure. FIG. 6B is a schematic partial cross-sectional view of the lens module of FIG. 6A. Referring to FIG. 6A and FIG. 6B, a lens module 100F of the embodiment includes a fastening member 170F. Specifically, the bolt and the nut of the aforementioned fastening assembly are two separate members and are split type, but the fastening member 170F of the embodiment is a screw, that is, the bolt and the nut are integrally formed and are integrated type. In the embodiment, a contact surface between the fastening member 170F and a fastening part 121F of the lens 120 has an arc-shaped surface 171F, and a plurality of dispensing grooves 172F are arranged on the arc-shaped surface 171F. After the lens 120 is adjusted and positioned, the adhesive is fixedly disposed in the dispensing groove 172F, which increases the contact area of the adhesive between the fastening member 170F and the lens 120, and increases the fastening force of the fastening member 170F. In other embodiments, the dispensing groove may be disposed in the fastening assembly of any of the aforementioned embodiments in an appropriate way, and the disclosure is not limited thereto.

In summary of the above, the embodiments of the disclosure have at least one of the following advantages or effects. With the thread pitch of the first external thread of the first fastening member of the fastening assembly being different from the thread pitch of the second external thread, the first fastening member, the second fastening member, or both may generate different displacement strokes with respect to the carrier in the process of rotating and screwing, and may have various combinations for micro-adjusting the distance between the lens and the carrier. The assembly components of the lens module of the disclosure are simplified, so that the accumulated tolerance may be reduced, and thus the quality of the projection picture may be effectively adjusted.

Furthermore, the contact surface between the second fastening member and the fastening part of the lens has fillets. Therefore, the design in which the second fastening member and the lens are in lineal contact may achieve a better degree of freedom of lens run-out adjustment, and the micro-deformation force is unlikely to occur when the housing structure of the lens is pulled or pressed. The first fastening member may further achieve a multi-stage micro-adjustment through the thread direction of the first external thread being different from the thread direction of the second external thread. In an embodiment, the lens module ensures the fastening force of the second fastening member through the fixing member and the third fastening member. In another embodiment, the fastening assembly adjusts the friction between the first fastening member and the second fastening member through the elastic body compressed between the first fastening member and the second fastening member. In other embodiments, the fastening member increases the contact area of the adhesive between the fastening member and the lens, and increases the fastening force of the fastening member through the dispensing groove. Or, the second fastening member has the dispensing groove that may accommodate a large amount of the adhesive and better control the amount of the adhesive, so that the adhesive is not scattered. The fastening method of the lens module of the disclosure may simplify the requirements for the operation direction of the automatic assembly and automatic adjustment equipment. In addition, the multi-stage micro-adjustment screw structure achieves the effect of micro-adjusting the distance without greatly reducing the pitch and processing customized threads, and has various options for size requirements.

However, the above are only preferred embodiments of the disclosure and are not intended to limit the scope of the disclosure. That is, all simple and equivalent changes and modifications made according to the claims and the contents of the disclosure are still within the scope of the disclosure. In addition, any of the embodiments or the claims of the disclosure are not required to achieve all of the objects or advantages or features disclosed herein. In addition, the abstract and title are used to assist in the search of patent documents, and are not intended to limit the scope of the disclosure. In addition, the terms "first," "second," and the like mentioned in the specification or the claims are used only to name the elements or to distinguish different embodiments or scopes, and are not intended to limit the upper or lower limit of the number of the elements.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the present disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the present disclosure as defined by the following claims. Moreover, no element and component in the present disclosure is intended to be dedicated to the public regardless of whether the element or component is explicitly recited in the following claims.

What is claimed is:

1. A lens module comprising a carrier, a lens, at least one fastening assembly, and at least one elastic member, wherein:
   the lens has at least one fastening part;
   the at least one fastening assembly comprises a first fastening member and a second fastening member, wherein the first fastening member has a first external thread and a second external thread, a thread pitch of the first external thread is different from a thread pitch of the second external thread, the second fastening member has a first internal thread, the first fastening member is configured to penetrate the at least one fastening part and be fastened to the carrier by the first external thread, and the first fastening member and the second fastening member are configured to be mutually fastened by the second external thread and the first internal thread, so that the at least one fastening part is limited between the second fastening member and the carrier; and
   the at least one elastic member is disposed between the carrier and the at least one fastening part, and is configured to push the at least one fastening part toward the second fastening member, wherein an end of the second fastening member has an arc-shaped surface, and the arc-shaped surface of the second fastening member is configured to be in contact with the at least one fastening part of the lens.

2. The lens module according to claim 1, wherein the first fastening member is configured to rotate in a first rotation direction and be fastened to the carrier, and the second fastening member is configured to rotate in a second rotation direction opposite to the first rotation direction and move toward the carrier along the first fastening member.

3. The lens module according to claim 1, wherein the first fastening member is configured to rotate in a first rotation direction and be fastened to the carrier, and the second fastening member is configured to rotate in the first rotation direction and move toward the carrier along the first fastening member.

4. The lens module according to claim 1, wherein the thread pitch of the first external thread is greater than the thread pitch of the second external thread.

5. The lens module according to claim 1, wherein the at least one fastening part has a through-hole, the first fastening member is configured to penetrate the through-hole, and the arc-shaped surface is configured to abut against an end of the through-hole.

6. The lens module according to claim 1, wherein a number of the at least one fastening part, a number of the at least one fastening assembly, and a number of the at least one elastic member are all three.

7. The lens module according to claim 1, wherein the second fastening member has a dispensing groove, and when the first fastening member and the second fastening member are mutually fastened, a part of the first fastening member is located in the dispensing groove.

8. The lens module according to claim 1, wherein the at least one fastening assembly further comprises an elastic body, the elastic body is disposed in the second fastening member, and when the first fastening member and the second fastening member are mutually fastened, the elastic body is compressed between the first fastening member and the second fastening member.

9. The lens module according to claim 8, wherein the elastic body has a second internal thread, and the first fastening member and the elastic body are configured to be mutually fastened by the second external thread and the second internal thread.

10. A lens module comprising a carrier, a lens, at least one fastening assembly, and at least one elastic member, wherein:
    the lens has at least one fastening part;
    the at least one fastening assembly comprises a first fastening member and a second fastening member, wherein the first fastening member has a first external thread and a second external thread, a thread pitch of the first external thread is different from a thread pitch of the second external thread, the second fastening member has a first internal thread, the first fastening member is configured to penetrate the at least one fastening part and be fastened to the carrier by the first external thread, and the first fastening member and the second fastening member are configured to be mutually fastened by the second external thread and the first internal thread, so that the at least one fastening part is limited between the second fastening member and the carrier; and
    the at least one elastic member is disposed between the carrier and the at least one fastening part, and is configured to push the at least one fastening part toward the second fastening member, wherein the lens module further comprises at least one fixing member and at least one third fastening member, the at least one fixing member has a clamping end and a fastening end, the clamping end is configured to be clamped on the second fastening member, and the at least one third fastening member is configured to fasten the fastening end to the carrier.

11. The lens module according to claim 10, wherein the second fastening member has a non-circular outer edge, the clamping end has a non-circular hole, and the non-circular outer edge is configured to be fitted on the non-circular hole.

12. The lens module according to claim 10, wherein the fastening end has an arc-shaped slot, and the third fastening member is configured to penetrate the arc-shaped slot and be fastened to the carrier.

13. The lens module according to claim 12, wherein a curvature center of the arc-shaped slot is located on a rotation axis of the second fastening member.

14. A fastening assembly adapted to be assembled with a lens, the fastening assembly comprising a first fastening member and a second fastening member, wherein:
    the first fastening member has a first external thread and a second external thread, wherein a thread pitch of the first external thread is different from a thread pitch of the second external thread; and
    the second fastening member has a first internal thread, wherein the first fastening member and the second fastening member are configured to be mutually fastened by the second external thread and the first internal thread, wherein an end of the second fastening member has an arc-shaped surface, and the arc-shaped surface of the second fastening member is configured to contact with at least one fastening part of the lens.

15. The fastening assembly according to claim 14, wherein the first fastening member is configured to rotate in a first rotation direction and be fastened to a carrier, and the second fastening member is configured to rotate in a second rotation direction opposite to the first rotation direction and move toward the carrier along the first fastening member.

16. The fastening assembly according to claim 14, wherein the first fastening member is configured to rotate in a first rotation direction and be fastened to a carrier, and the second fastening member is configured to rotate in the first rotation direction and move toward the carrier along the first fastening member.

17. The fastening assembly according to claim 14, wherein the thread pitch of the first external thread is greater than the thread pitch of the second external thread.

18. The fastening assembly according to claim 14, wherein the second fastening member has a dispensing groove, and when the first fastening member and the second fastening member are mutually fastened, a part of the first fastening member is located in the dispensing groove.

19. The fastening assembly according to claim 14, wherein the fastening assembly further comprises an elastic body, the elastic body is disposed in the second fastening member, and when the first fastening member and the second fastening member are mutually fastened, the elastic body is compressed between the first fastening member and the second fastening member.

20. The fastening assembly according to claim 19, wherein the elastic body has a second internal thread, and the first fastening member and the elastic body are configured to be mutually fastened by the second external thread and the second internal thread.

* * * * *